United States Patent
Strothmann et al.

(10) Patent No.: US 9,884,595 B2
(45) Date of Patent: Feb. 6, 2018

(54) CABLE CONNECTION FOR A MOTOR UNIT OF AN ELECTRIC AUXILIARY DRIVE FOR A BICYCLE

(71) Applicant: HIGHTEC EDV-SYSTEME GMBH, Saarbrücken (DE)

(72) Inventors: Vera Strothmann, Saarbrücken (DE); Stefan Hittinger, Ottweiler (DE)

(73) Assignee: HIGHTEC EDV-SYSTEME GMBH, Saarbrücken (DE)

( * ) Notice: Subject to any disclaimer, the term of this patent is extended or adjusted under 35 U.S.C. 154(b) by 253 days.

(21) Appl. No.: 14/900,576

(22) PCT Filed: Jun. 20, 2014

(86) PCT No.: PCT/DE2014/100207
§ 371 (c)(1),
(2) Date: Dec. 21, 2015

(87) PCT Pub. No.: WO2014/202059
PCT Pub. Date: Dec. 24, 2014

(65) Prior Publication Data
US 2016/0129858 A1    May 12, 2016

(30) Foreign Application Priority Data

Jun. 20, 2013 (DE) .................. 20 2013 102 672 U

(51) Int. Cl.
| | |
|---|---|
| H02K 11/00 | (2016.01) |
| B60R 16/02 | (2006.01) |
| B62M 6/60 | (2010.01) |
| B62J 6/18 | (2006.01) |
| H01R 13/58 | (2006.01) |

(Continued)

(52) U.S. Cl.
CPC .............. *B60R 16/02* (2013.01); *B62J 6/18* (2013.01); *B62M 6/60* (2013.01); *H01R 13/582* (2013.01); *H01R 13/5845* (2013.01); *H02K 7/006* (2013.01); *H02K 11/0094* (2013.01); *B62J 2099/004* (2013.01)

(58) Field of Classification Search
CPC ..... H02K 7/1846; H02K 5/225; H02K 1/2786
USPC .............. 310/71, 67 A, 75 C; 475/5; 439/36; 301/6.5
See application file for complete search history.

(56) References Cited

U.S. PATENT DOCUMENTS

| | | | | |
|---|---|---|---|---|
| 5,763,980 A | * | 6/1998 | Li | ............................ B62M 6/45 |
| | | | | 310/323.03 |
| 5,874,792 A | * | 2/1999 | Chen | .......................... B62J 6/12 |
| | | | | 310/268 |

(Continued)

FOREIGN PATENT DOCUMENTS

| | | |
|---|---|---|
| JP | 2001071983 A | 3/2001 |
| JP | 2005080490 A | 3/2005 |
| JP | 2013082272 A | 5/2013 |

*Primary Examiner* — Thanh Lam
(74) *Attorney, Agent, or Firm* — Lucas & Mercanti, LLP; Klaus P. Stoffel

(57) ABSTRACT

A cable connection on a motor unit of an electric auxiliary drive for a bicycle, the motor unit includes an external rotor having a rotational axis that is perpendicular to the plane of the wheels. The cable connection has a solid connecting piece which can be connected to the motor unit and conductors for connection to the cores of a cable to be fed at an angle.

13 Claims, 1 Drawing Sheet

(51) Int. Cl.
*H02K 7/00* (2006.01)
*B62J 99/00* (2009.01)

(56) References Cited

U.S. PATENT DOCUMENTS

| | | | |
|---|---|---|---|
| 2004/0189112 A1* | 9/2004 | Fujii | B62J 6/001 |
| | | | 310/67 A |
| 2005/0029879 A1* | 2/2005 | Endo | B62J 6/12 |
| | | | 310/75 C |
| 2005/0037633 A1 | 2/2005 | Endo | |
| 2006/0163961 A1* | 7/2006 | Iteya | B62J 6/12 |
| | | | 310/75 C |
| 2007/0252452 A1* | 11/2007 | Ishimoto | B62J 6/12 |
| | | | 310/67 A |
| 2012/0149517 A1 | 6/2012 | Ko et al. | |
| 2012/0161495 A1 | 6/2012 | Ito | |

* cited by examiner

CABLE CONNECTION FOR A MOTOR UNIT OF AN ELECTRIC AUXILIARY DRIVE FOR A BICYCLE

The present application is a 371 of International application PCT/DE2014/100207, filed Jun. 20, 2014, which claims priority of DE 20 2013 102 672.7, filed Jun. 20, 2013, the priority of these applications is hereby claimed and these applications are incorporated herein by reference.

BACKGROUND OF THE INVENTION

The invention relates to a cable connection to a motor unit of an electric auxiliary drive for a bicycle, wherein the motor unit has an external rotor with a rotation axis which is perpendicular in relation to the plane of the bicycle wheels.

Motor units of electric auxiliary drives for a bicycle which have an external rotor are used as hub motors for driving the front wheel or rear wheel, but are also mounted between the wheels in the region of the pedal crank, wherein a battery which supplies power to the motor unit can be fitted to the bicycle frame at different points at a distance from the motor unit. A cable has to be led away from the motor unit to a point above the motor unit on the chassis in each case.

Leading away a supply cable of this kind while avoiding loops which project laterally to a certain extent out of the plane of the frame requires sharp, kink-like bending of the cable immediately after it exits from the motor unit. A narrow bending radius of this kind subjects the cable to severe strain and there is a risk of defects. In addition, a kink of this kind in a cable does not have an advantageous appearance.

SUMMARY OF THE INVENTION

The invention is based on the object of providing a cable connection for a motor unit of an electric auxiliary drive for a bicycle, which cable connection is improved in respect of functional reliability, wear and appearance.

The cable connection according to the invention which achieves this object is characterized by a solid connection piece which can be connected to the motor unit and has conductors for connection to the cores of a cable which is to be fed at an angle in relation to the rotation axis and also for connection to conductor pieces which are to be connected in the interior of the motor unit.

Therefore, according to the invention, a solid connection piece is fitted to the motor unit, it being possible for a cable to be led away by said solid connection piece in a direction at an angle to the rotation axis of the external rotor, preferably in a direction perpendicular in relation to said rotation axis. Conductor pieces which are laid in the interior of the motor unit parallel to the motor rotation axis can then be led away by the connection piece.

In a particularly preferred embodiment of the invention, the connection piece is formed in two parts with a plug part and a socket part. A connection piece of this kind advantageously simplifies assembly work on the bicycle both during production of the bicycle and also during repair and servicing work. In particular, the motor is easier to handle after the plug connection is released than a motor with a permanently connected cable.

In a further refinement of the invention, the connection piece has an attachment for relieving strain on the cable, said attachment extending at an angle in relation to the rotation axis, preferably at a right angle to the rotation axis. The electrical connections are advantageously protected against undesired tensile strain owing to the strain relief. The attachment is expediently formed on the plug part of the connection piece.

The connection piece can have an insulating housing in which the conductors which are laid therein are additionally fixed and protected by an encapsulation compound.

In a further refinement of the invention, a part of the connection piece, which part is intended to be connected to the cable, is provided with a removable cover which is preferably screwed to the other part.

This cover can be used as a strain-relief means and can be pressed against the cable as part of the process of being fastened by screws to the other part.

In a further embodiment, the connection piece is arranged on a shaft which is fixedly connected to the bicycle and on which the external rotor is rotatably mounted, and held there preferably in a rotationally fixed manner.

In particular, the connection piece can be arranged axially between a rotary bearing for the external rotor and a supporting lever which is supported against a frame part and is intended to clear a countertorque of the motor unit.

Said attachment is expediently arranged in an axial position between a brake disk, which is connected to the external rotor, and the supporting lever.

The invention will be explained further in the text which follows with reference to an exemplary embodiment and the accompanying drawings which relate to said exemplary embodiment and in which:

DETAILED DESCRIPTION OF THE INVENTION

Figure 1:
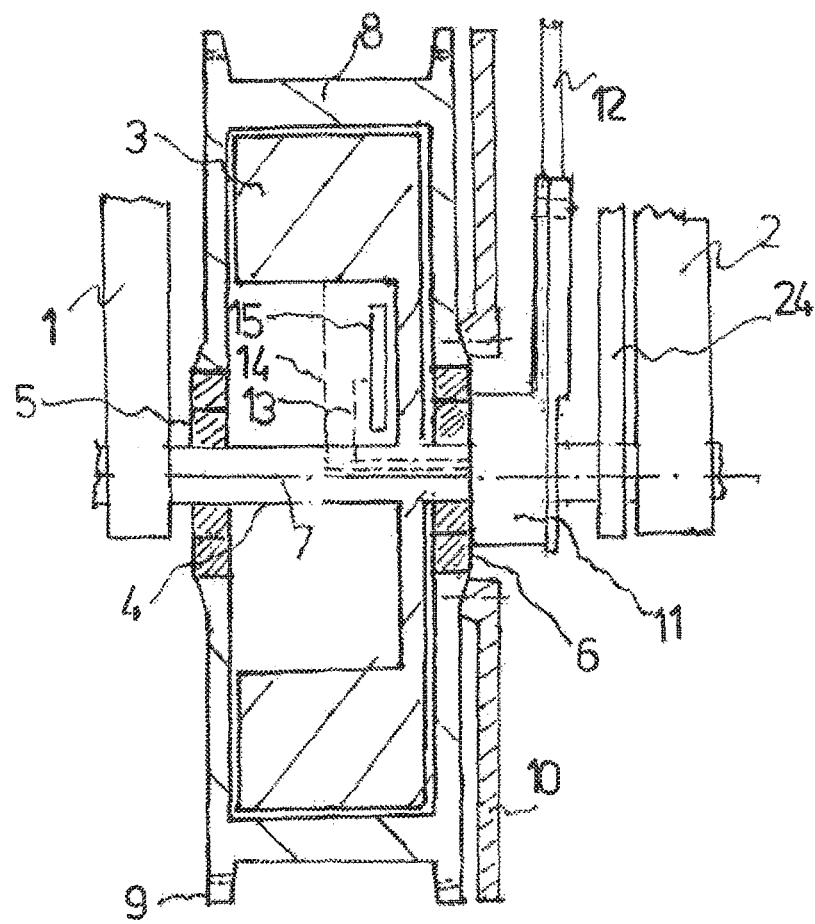
FIG. 1 shows a partially sectional illustration of a motor unit of an electric auxiliary drive for a bicycle.

A motor unit which is arranged between limbs 1, 2 of a fork of a front wheel of a bicycle or other parts of the bicycle frame comprises a stator 3 which is rigidly connected to a shaft 4 which is coaxial to the stator and which, for its part, is fixedly connected, in a manner not illustrated in any detail here, to the fork limbs 1, 2.

An external rotor 8 is mounted, such that it can rotate about a rotation axis 7, on the shaft 4 by means of bearings 5 and 6.

As shown in FIG. 1, a brake disk 10 is connected to the external rotor 7, for example by screw-connection to a perforated rim (not shown) which surrounds the bearing 6. Reference numeral 24 refers to a supporting lever which is rigidly connected to the shaft 4 and which transmits a countertorque of the motor unit to the limb 2 or to another frame part.

A connection piece 11 which is connected in a rotationally fixed manner to the shaft 4 is arranged on the shaft 4 in an axial position between the bearing 6 and the supporting lever 24, said connection piece being connected to a cable 12 which is fed perpendicularly in relation to the rotation axis 7.

The cable 12 contains cable cores which transmit both data and current which are to be supplied to the motor unit. The cable cores are connected to conductors which are laid in the connection piece 11 and, for their part, are connected to the stator 3 and to an electronics assembly 15 by means of line pieces 13, 14 which are indicated by dashed lines by way of example.

The cable 12 is advantageously not subject to any bending during the course of connection to the motor assembly.

Figure 2:
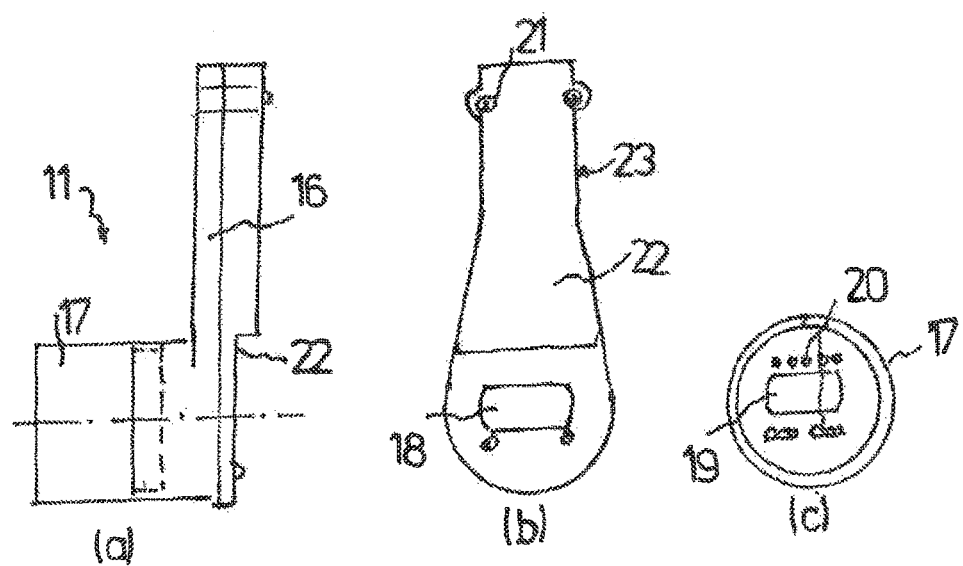
FIG. 2 shows different views of a connection piece which is used in the motor assembly of FIG. 1.

As can be seen in FIG. 2, the connection piece 11 which has a plastic housing is formed in two parts with a plug part 16, which is connected to the cable 12, and a socket part 17. An aperture 18 or 19 serves for rotationally fixed mounting on the correspondingly flattened shaft 4 (flattened portion not shown in FIG. 1). The socket part 17 has socket parts 20 which are connected to corresponding conductor sections. Projecting pins (not shown) are accordingly formed in the plug part 16.

The housing can be encapsulated entirely with insulating material, with the conductors which are laid in the housing being incorporated.

As can further be seen in FIG. 2, the plug part 16 has a cover 22 which is connected to the other plug part by means of screws 21. After the cover 22 is removed, the cores of the cable 12 can be soldered to corresponding connection points of the plug part 16. When the cover 22 is screw-connected to the other part 16, the sheathing of the cable 12 is simultaneously clamped by means of an attachment 23 which extends at a right angle in relation to the plugging axis, and the cable 12 is therefore advantageously relieved of strain.

The invention claimed is:

1. A cable connection for a motor unit of an electric auxiliary drive for a bicycle, wherein the motor unit has an external rotor with a rotation axis which is perpendicular in relation to a plane of bicycle wheels of the bicycle, the cable connection comprising a solid connection piece that is connectable to the motor unit and has conductors for connection to cores of a cable that is fed at an angle relative to the rotation axis and for connection to conductor pieces that are connectable in an interior of the motor unit.

2. The cable connection as claimed in claim 1, wherein the cable is connectable to the connection piece at a right angle to the rotation axis.

3. The cable connection as claimed in claim 1, wherein the connection piece has an attachment for relieving strain on the cable, said attachment extending at an angle relative to the rotation axis.

4. The cable connection as claimed in claim 3, where the attachment extends at a right angle relative to the rotation axis.

5. The cable connection as claimed in claim 3, wherein the connection piece is formed in two parts includes a plug part and a socket part.

6. The cable connection as claimed in claim 5, wherein the attachment is formed on the plug part.

7. The cable connection as claimed in claim 1, wherein the conductors are encapsulated in an insulating housing of the connection piece.

8. The cable connection as claimed in claim 1, wherein a part of the connection piece intended to be connected to the cable has a removable cover which is screwed to the other part.

9. The cable connection as claimed in claim 8, wherein the cover is pressable against the cable for strain-relief purposes.

10. The cable connection as claimed in claim 1, wherein the connection piece is arranged on a shaft that is fixedly connected to the bicycle and on which the external rotor is rotatably mounted.

11. The cable connection as claimed in claim 10, wherein the connection piece is rotationally fixed on the shaft.

12. The cable connection as claimed in claim 11, wherein the connection piece is arranged axially between a rotary bearing for the external rotor and a supporting lever that is supported against a frame part.

13. The cable connection as claimed in claim 12, wherein an axial position of the attachment is arranged between a brake disk, which is connected to the external rotor, and the supporting lever.

* * * * *